(12) United States Patent
Huewel

(10) Patent No.: US 7,399,086 B2
(45) Date of Patent: Jul. 15, 2008

(54) IMAGE PROCESSING METHOD AND IMAGE PROCESSING DEVICE

(76) Inventor: Jan Huewel, Leindeckerstrasse 8, D-50825 Cologne (DE)

( * ) Notice: Subject to any disclaimer, the term of this patent is extended or adjusted under 35 U.S.C. 154(b) by 336 days.

(21) Appl. No.: 11/222,159

(22) Filed: Sep. 8, 2005

(65) Prior Publication Data
US 2006/0050243 A1    Mar. 9, 2006

(30) Foreign Application Priority Data
Sep. 9, 2004   (DE) .................. 10 2004 044 004

(51) Int. Cl.
*G03B 21/14* (2006.01)
(52) U.S. Cl. .......................... 353/69; 353/70
(58) Field of Classification Search .......... 353/69, 353/70
See application file for complete search history.

(56) References Cited

U.S. PATENT DOCUMENTS

| | | | | |
|---|---|---|---|---|
| 5,795,046 A * | 8/1998 | Woo | .............. | 353/69 |
| 6,361,171 B1 | 3/2002 | Ejiri et al. | .............. | 353/69 |
| 6,367,933 B1 * | 4/2002 | Chen et al. | .............. | 353/69 |
| 6,416,186 B1 * | 7/2002 | Nakamura | .............. | 353/69 |
| 6,761,457 B2 * | 7/2004 | Wada et al. | .............. | 353/70 |
| 6,947,610 B2 * | 9/2005 | Sun | .............. | 382/293 |
| 6,997,563 B1 * | 2/2006 | Wang et al. | .............. | 353/70 |
| 7,001,023 B2 * | 2/2006 | Lee et al. | .............. | 353/69 |
| 7,093,940 B2 * | 8/2006 | Kubo et al. | .............. | 353/69 |
| 7,233,370 B2 * | 6/2007 | Itaki | .............. | 348/745 |
| 2003/0095239 A1 * | 5/2003 | Hirao et al. | .............. | 353/69 |
| 2003/0210381 A1 * | 11/2003 | Itaki | .............. | 353/70 |
| 2006/0017890 A1 * | 1/2006 | Inazumi | .............. | 353/69 |

FOREIGN PATENT DOCUMENTS

| | | |
|---|---|---|
| JP | 2003 009 038 A | 1/2003 |
| WO | WO 02/101443 A2 | 12/2002 |
| WO | WO 02/101443 A3 | 12/2002 |

* cited by examiner

*Primary Examiner*—William C. Dowling
(74) *Attorney, Agent, or Firm*—Fay Sharpe LLP

(57) ABSTRACT

For keystone correction of the perspective distortion of an image (18) projected onto a projection surface (12), an image existing in electronic form is processed by a processing device to reverse the perspective distortion. For this purpose, the processing device, respectively rotates and shifts exactly one image line (36) at a time, respectively, while the orientation of the other image lines (40,42,46) is maintained fixed. In addition or alternately, the image lines (36,40,42,46) of the original electronic image comprise a plurality of partial sections of equal lengths which are differently stretched and/or compressed by the processing device. Subsequently, the image is newly computed under consideration of all of the image lines (36,40,42,46) and is projected onto a projection surface (12) by a projector.

18 Claims, 6 Drawing Sheets

IMAGE PROCESSING METHOD AND IMAGE PROCESSING DEVICE

BACKGROUND OF THE INVENTION

The present invention relates to an image processing method for processing an electronic image which can be projected onto a projection surface, particularly a screen. Further, the invention relates to an image processing device for performing said image processing method.

Normally, projected images are projected, by means of an image processing device such as, e.g., a projector or video beamer, onto a projection surface such as, e.g., a screen or a smooth white wall. For this purpose, the projection device is arranged frontally towards the projection surface so that the image plane of the projected image on the projection surface and the image plane of the virtual image are arranged parallel to each other. However, it may happen that the projection device has been erroneously or out of necessity placed in a non-frontal orientation in front of the projection surface. In such a case, the image plane of the virtual image is not arranged parallel to the plane of the projection surface so that, since the projection is not performed at a right angle anymore, the projected image will undergo a perspective distortion.

To be able to reverse this perspective distortion of the projected image, it is known, in the field of images existing in electronic form, to electronically distort the electronic image in such a manner that the optical distortion caused by the above outlined conditions will be compensated for. To achieve this effect, it is known from WO 02/101443 to compute an inverse transformation matrix for distorting the electronic image. For this purpose, however, one has to know the exact angle at which the projected beam of a projecting means is incident on a screen or the like surface. On the other hand, this angle is often not known and has to be detected in a complex manner. According to JP 2003 009 038, for instance, the angle is determined by projecting various test images and detecting that test image which results in a distortion-free projected image. To the thus selected test image, one can then assign a concrete angle at which the beam projected from the projection device will be incident on the screen. However, especially if the screen has been rotated e.g. both about a horizontal axis and a vertical axis relative to the projection direction of the projection device, the detecting of the required angle is extremely difficult because this process would necessitate an excessively large number of test images.

According to a known approach for correcting the perspective distortion of the projected image ("keystone correction"), a trapezoidal distortion can be performed. In doing so, the image existing in electronic form, usually being an image of a rectangular shape, is distorted to cause it to assume a trapezoidal shape. The extent of this trapezoidal distortion is set to the effect that the trapezoidal distortion of the electronic image will be reversed by the perspective distortion of the projected image, resulting in a rectangular projected image appearing to the viewer.

For keystone correction by trapezoidal distortion, the rectangular electronic image comprises four image edges which define the shape of the electronic image. Further, the electronic image comprises an image content including a plurality of image elements; these image elements are e.g. partial surfaces of a rendered image. For instance, when effecting a trapezoidal distortion, the right-hand and the left-hand edges of the image are rotated in different rotational senses so that the upper image edge will be compressed and the lower image edge will be stretched, or vice versa. Because of the altered shape of the electronic image, the image content will be newly computed under consideration of all image edges, while the individual image elements of the image content will be stretched or compressed to different degrees, depending on their position within the image.

When performing the above keystone correction corresponding to the trapezoidal distortion, cases where the projection device is arranged obliquely to the projection surface both in the horizontal and the vertical directions will disadvantageously entail the need for two different trapezoidal distortions which overlap each other. Due to this overlap, the operator of the projection device, e.g. a lighting engineer, will already in the first trapezoidal distortion also have to consider the change of the shape of the image caused by the second trapezoidal distortion. This is extremely difficult and prone to failure so that, normally, several trapezoidal distortion steps are required until the perspective distortion of the projected image has been compensated for.

Further, from U.S. Pat. No. 6,361,171 B1, a keystone correction is known wherein the corner points of a rectangular electronic images can be shifted as desired. However, when shifting each individual corner point, it is required to move the corner point into two different coordinate directions. Since the controlling of projection devices is normally carried out via a control panel with several turning switches or slide switches, the user will first have to operate a first switch to move the corner point of the electronic image into a first coordinate direction and then have to change the function of the turning switch so as to move the corner point into a second coordinate direction. Because the movement by which the corner point of the projected image on a projection face arranged obliquely in space is displaced into both coordinate directions will not be performed at right angles, it will be correspondingly difficult to reach the desired end point; thus, several correction steps are required until an individual corner point has reached the desired end point. The same difficulties arise when the operator, using two control switches, moves the corner point both into the first and into the second coordinate direction, entailing the additional disadvantage that the user has to employ both hands so that possible further setting measures cannot be carried out.

It is an object of the invention to provide an image processing method and an image processing device with improved keystone correction.

According to the present invention, the above object is achieved by an image processing method and an image processing device as described in the claims.

SUMMARY OF THE INVENTION

In the image processing method of the invention, there is processed an electronic image, particularly a vectorized image, which is to be projected onto a projection surface, particularly a plane surface such as e.g. a screen or a geometric body of a certain desired configuration. Particularly, the projection surface shall be arranged at a desired orientation in space. For this purpose, the electronic image is first made available in a storage device. The electronic image comprises a shape and an image content. The shape or geometry of the electronic image is defined by image lines. In a preferably rectangular electronic image, the image lines will particularly be the image edges of the rectangular electronic image. Depending on the shape of the electronic image and/or the geometry of the projection surface, the image lines can also be defined without having them coincide with image edges. In a circular or elliptical electronic image, for instance, the image lines can be selected to be the semimajor axis and the semiminor axis.

The image content comprises a plurality of image elements which can be stretched or compressed in dependence on the shape of the electronic image. To reduce distortions of the image projected onto the projection surface or to represent intentionally distorted images, the image lines are processed using a processing device so that the electronic image is altered particularly geometrically. Under consideration of all image lines, which before may possibly have been processed only partially, the image content of the electronic image is newly computed by means of a computing device. The newly computed electronic image is then visualized through a representation device; this representation device can be e.g. a monitor of an image processing device used for this purpose, or a projector such as, e.g., a video beamer.

When processing the image lines, it is provided according to the instant invention that respectively exactly one image line will be rotated and/or shifted to thus change the orientation and/or position of the respective image line. During the rotating/shifting of one image line, the orientation of the other image lines is maintained. If the image lines are e.g. the image edges of a rectangular image, the two corner points which as end points delimit the rotating edge of the image, will thus be moved not along a circular path but along the extension of the image edges following the image edge which is to be rotated. This means that, during the rotation, the to-be-rotated image edge and the image edges following this image edge are stretched or compressed in such a manner that only the orientation of the rotating image edge is changed.

Since the orientation of the other image lines is maintained, the processing of the electronic image can be carried out in a very simple and intuitive manner. For a keystone correction of an image projected onto a projection surface, it will be sufficient if the individual image lines are aligned one after the other in the desirable orientation for the viewer. For instance, the image edges of a rectangular electronic image which has been perspectively distorted by the projection are successively oriented horizontally and vertically, respectively, and are subjected to this orienting process until right angles are obtained between two adjacent edges of the image. In an e.g. rectangular electronic image, it is also possible to orient the image edges with reference to the edges of a screen, the edges defining the projection surface. Further, the image edges of the electronic image can be oriented with reference to markers applied to a wall. Particularly, it made possible to have the projected image represented to the viewer in an undistorted manner irrespective of whether or not the direction of the representation and/or the projection surface is arranged obliquely relative to a viewer. Knowledge of a concrete angle at which the projected image is incident on the projection face and of the concrete distance of the representation device to the projection surface is not required. Further, it is not necessary anymore to perform several subsequent correction steps. As a result, the keystone correction is simplified and can be performed in less time.

According to an independent invention, the image lines of the original electronic image comprise a plurality of partial sections of equal lengths, which, according to the invention, can be differently stretched and/or compressed by the processing device during the processing procedure. Thereby, the concentration of the image elements within the electronic image is varied, while the overall length of the image lines is maintained. Particularly, the different stretching/compressing as provided by the invention can be performed independently of other processing procedures performed on the image lines, i.e. a processing of respectively one image line each time is not positively necessary for this purpose. The different stretching/compressing of the partial sections can also be carried out in combination with keystone corrections corresponding to the trapezoidal distortion or corresponding to the free displacement of corner points. In this manner, it is possible to compensate for the perspective distortion within the projected image resulting from the different lengths of the projection beams onto a projection surface. Accordingly, the different stretching and compressing, respectively, of the individual image elements of the image content can be corrected for or deliberately brought about. Thereby, particularly, even extremely tilted positions of a projector relative to a projection surface are made possible, allowing virtually any desired orientation of the projector relative to the projection surface. It is not required to know the angle at which the projected image impinges on the projection surface or to know the distance from the projector to the projection surface. Thus, image projections can be realized also in rooms where several—possibly shadow-casting—objects are located since the projector can be oriented in a direction passing by the objects, e.g. at a steep angle from above. Further, the quality of the keystone correction is distinctly improved.

During the stretching/compressing of the partial sections, the overall length of the image lines is preferably maintained. Thereby, within an image line which is kept constant, the processing device will change the length distribution of the individual sections. Particularly, the length ratio of two adjacent partial sections is set to be identical for all partial sections. Thus, the length distribution of the partial sections is made uniform. Further, for the stretching and compressing of the individual partial sections, there is thus generated a common parameter which, when manipulated by the processing device, allows for a very simple keystone correction. Particularly, in case of uneven projection surfaces, the length ratios of two adjacent partial sections can be set to different values. For instance, in case of a cylindrical projection surface, the length ratio of the partial sections in the outer regions of the cylinder can be identical while increasing or decreasing towards the center.

Preferably, the projection surface is provided with projection lines which define the shape of the projection surface. The projection lines can be e.g. the lateral edges of a screen or markers on a plane surface which indicate the position and the size that the projected image is desired to have. In this manner, it is possible, when processing the image lines, to rotate and/or shift the image line until the image lines are oriented relative to the projection lines, thus effecting a keystone correction in an especially simple manner. Particularly, it is possible to adjust the image edges of a to-be-projected rectangular image in a manner causing them to be arranged directly above the lateral edges of a screen or respectively equidistantly to these edges.

Preferably, the detection of the projection lines is performed automatically, thus allowing for automatic adaptation of the to-be-projected image to the projection lines. The detection is performed e.g. by distance measurements for thereby detecting e.g. the lateral edges of a screen which are arranged at a certain distance to a background. Further, using the detection device, the contrast or the brightness can be measured, making it possible to detect e.g. colored markers delimiting the projection surface. Further, the option exists to integrate a sensor field, comprising e.g. a plurality of photo elements, in the projection surface; thus, the image which is to be projected and particularly the image lines can be detected automatically. Further, e.g. through distance measurement, the orientation and/or the shape of the projection surface can be detected in a three-dimensional space so that this information can be used particularly in the processing device to allow for an automatic processing of the image lines. This, particularly, offers the possibility to process the electronic image completely already before it will be projected the first time. Still further, it is rendered possible to automatically compensate for disturbances or perspective distortions caused by movements of a projector and/or a projection surface.

Particularly, the projection surface is divided into a plurality of partial surfaces whose shapes are defined by a plurality of partial projection lines. Further, the electronic image can divided into a plurality of partial images whose shapes are defined by a plurality of partial image lines; particularly, each partial image lines can be processed individually by the processing device. Thereby, it is possible to project the electronic image also onto projection surfaces which comprise corners, edges or steps because a dedicated keystone correction can be performed for each partial area. Thus, it is made possible, for instance, to project an image distortion-free in a spatial corner. Further, even a waving flag or the like can be used as a projection surface, offering various artistically/esthetically appealing possibilities for use.

The image processing device according to the present invention which is particularly suited for performing the image processing method according to the present invention comprises a storage means for storing electronic images, wherein the electronic images comprise a plurality of image lines for defining the shape of the image, and an image content including a plurality of image elements. Further, the image lines of the original electronic images can comprise a plurality of partial sections of identical length. Further, the image processing device comprises a processing device for processing the image lines; in the processing, different degrees of stretching and compressing, respectively, of the partial sections will be generated, and/or the positioning and/or adjustment of respectively exactly one image line will be changed. Further, a computing means is provided for the renewed computation of the image content of the electronic image under inclusion of all image lines. Further, the image processing device comprises a display means for visual representation of the calculated electronic image.

Preferably, the image processing device according to the present invention further has various features corresponding to the above described image processing method. Thus, particularly, the image processing device includes a projection means, such as e.g. a projector or a video beamer, for projecting the newly computed image onto a projection surface, particularly a screen. Preferably, the image processing device includes a detection device for detecting the shape of the projection surface or the shape of the projection lines defining the shape of the projection surface. If desired, the detecting means can be used for detecting the relative orientation and/or position of the projection means relative to the projection surface. Further, the detecting means can include measurement means for contrast measurement and/or brightness measurement and/or distance measurement, e.g. with the aid of a laser distometer.

A preferred embodiment of the invention will be described in greater detail hereunder with reference to the accompanying drawings.

DETAILED DESCRIPTION OF A PREFERRED EMBODIMENT

Figure 1:
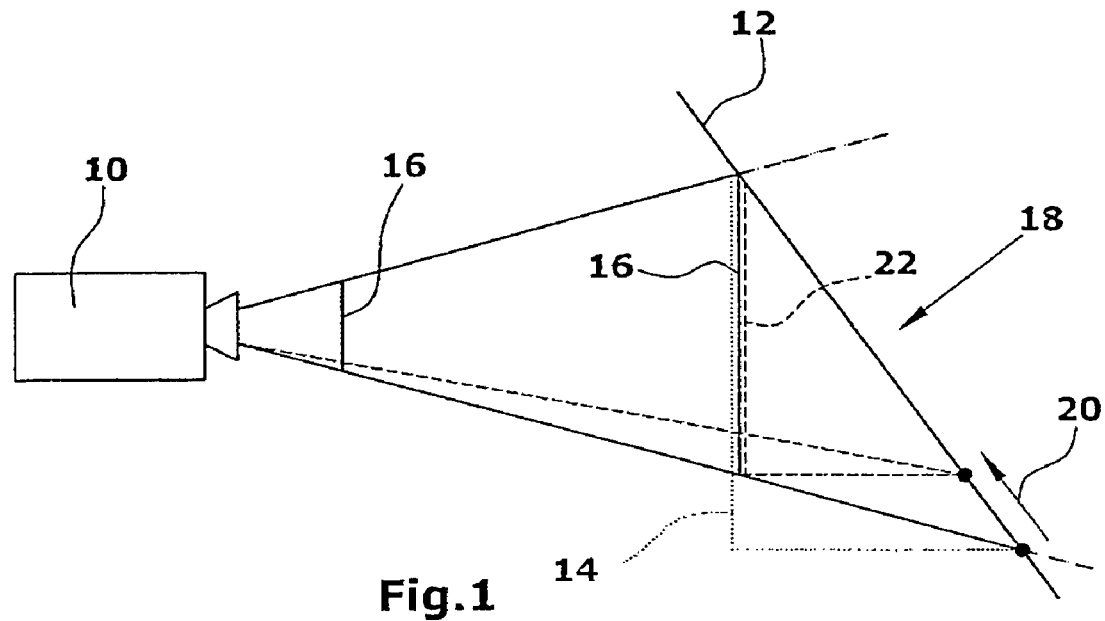
FIG. 1 is a schematic lateral view illustrating the projection of an electronic image onto a projection surface arranged at an inclination.

When a projector 10 projects an image onto an obliquely arranged projection surface 12, the virtual image 14 of the image to be projected is different from the virtual image 16 of a projected image 18, the difference residing in a perspective distortion of the projected image 18 (FIG. 1). To cause the virtual image 14 of the projected image 18 to coincide with the virtual image 16 of the to-be-projected image, the projected image 18 is compressed in the direction of arrow 20 in such a manner that a corrected virtual image 22 is generated which coincides with the prior virtual image 16 of the image to be projected.

Figure 2:
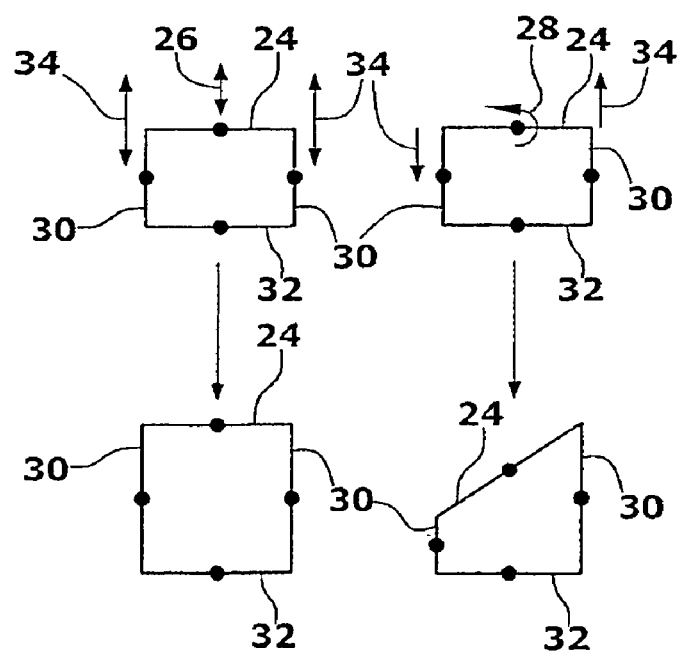
FIG. 2 is a schematic view illustrating the possibilities for processing exactly one image line by use of the image processing method according to the present invention.

According to the image processing method of the present invention, to reverse the perspective distortion of the projected image 18, exactly one image line 24 will be shifted in the direction indicated by arrow 26 (FIG. 2, left-hand side) and/or is rotated in the direction indicated by arrow 28 (FIG. 2, right-hand side). The orientation of the other image lines 30,32 is maintained, i.e. the image lines 30,32 are not rotated. The image lines 30 adjacent to the displaced or rotated image line 24 are stretched and compressed, respectively, in the direction indicated by arrows 34. The image line 32 opposite the processed image line 24 remains unchanged.

Figure 3:
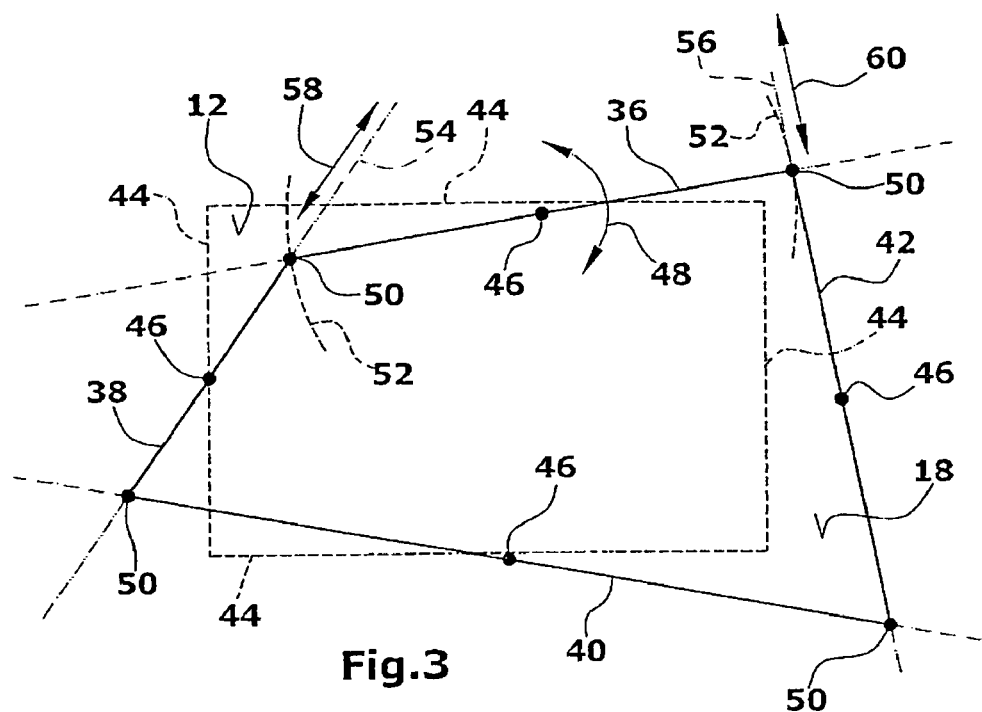
FIG. 3 is a schematic view of an image with perspective distortion.

For instance, in a rectangular image which is projected onto a projection surface 12 arranged obliquely in space, the projected image 18 comprises image edges 36,38,40,42 which after projection are arranged in skewed orientations (FIG. 3). In the illustrated embodiment, the projection surface 12 comprises projection lines 44 which define that arrangement of the image edges 36,38,40,42 which is optimum for the viewer. The projection lines 44 can be e.g. the edges of a screen or of a projection surface 12 limited by markers. To compensate for the perspective distortion of the projected image 18, i.e. for keystone correction, it is first provided to rotate the upper image edge 36 about a point of rotation 46 in the direction of arrow 48. The point of rotation 46 is preferably arranged between the end points 50 of the upper image edge 36. Particularly, the point of rotation 46 is arranged at identical distances to the end points 50 and is preferably located in the center of the image edge 36. According to the invention, during the rotation, the end points 50 of the upper image edge 36 will migrate not along a circular path 52 but along the orientation 54,56 in the direction of the arrows 58,60 of the image edges 38,42 joining the image edge 36. Due to the fact that the image edges 38,42 have maintained their orientation during the rotation of the image edge 36, there has occurred a stretching of the image edge 38 and a compressing of the image edge 42 and, in the illustrated embodiment, a compressing of the image edge 36.

Figure 4:
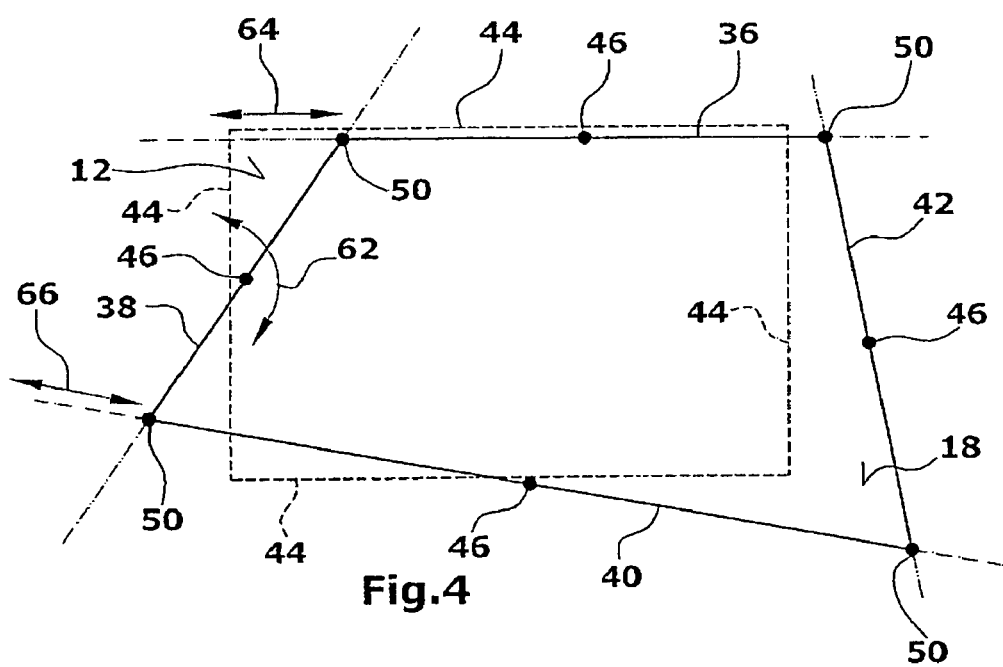
FIG. 4 is a schematic view of the image with perspective distortion shown in FIG. 3, with one processed image line.

The upper image edge 36 is rotated until it is oriented along the upper projection line 44 (FIG. 4). In the illustrated embodiment, the upper image edge 36 is arranged parallel to the upper projection line 44. Subsequently, the left image edge 38 is rotated in the direction of arrow 62 about a point of rotation 46 whereby the upper image edge 36 and the lower image edge 40 are rotated and compressed, respectively, in the direction of arrows 64 and 66, respectively.

Figure 5:
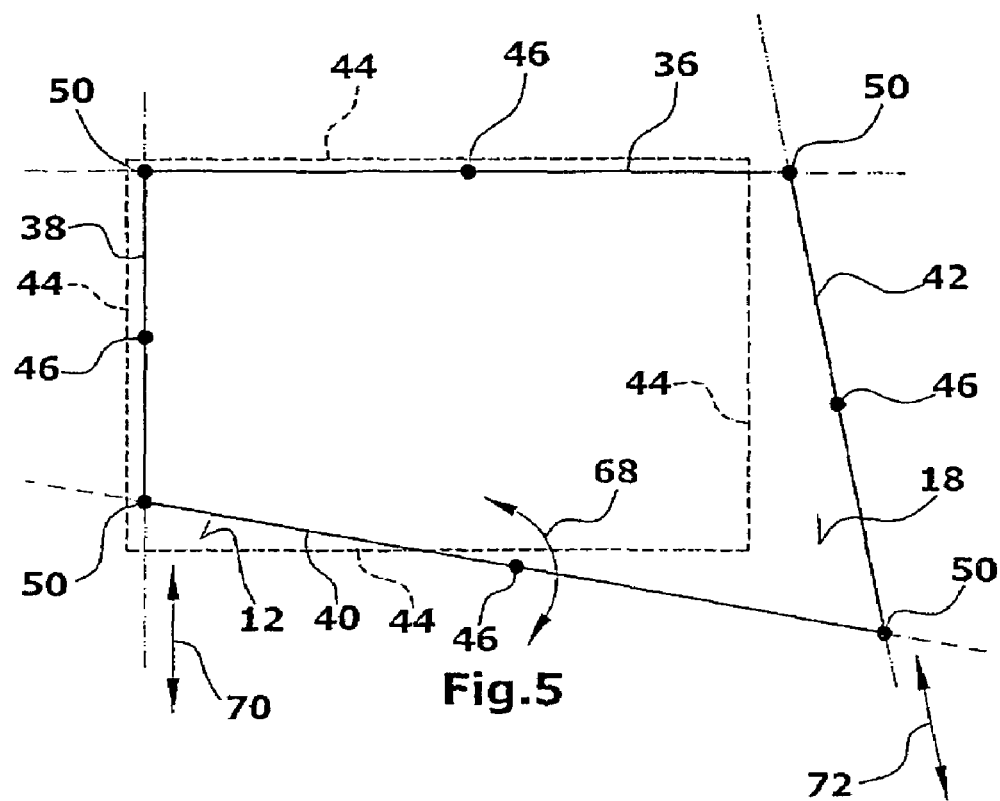
FIG. 5 is a schematic view of the image with perspective distortion shown in FIG. 3, with two processed image lines.

The left image edge 38 is rotated until a right angle is obtained between the upper image edge 36 and the left image edge 38 (FIG. 5). Since, in the illustrated embodiment, the projection lines 44 are arranged in a rectangular configuration, the left image edge 38 is also arranged in parallel to a projection line 44. Since the rotation of the image edge 38 has caused a change of the length of image edge 38, also the point of rotation 46 has shifted along the image edge 38 during the rotation. Since the rotation is preferably performed always about the current center of an image edge 36,38,40,42 or of an image line 24,30,32, the accurate orientating of the individual image edges 36,38,40,42 or image lines 24,30,32 relative to each other can be carried out in a simple and intuitive manner. After the left image edge 38 has been oriented, the lower image edge 40 is rotated about the point of rotation 46 in the direction of arrow 68 so that the left image edge 38 and the right image edge 42 will be stretched and compressed, respectively, in the directions of arrows 70 and 72, respectively.

Figure 6:
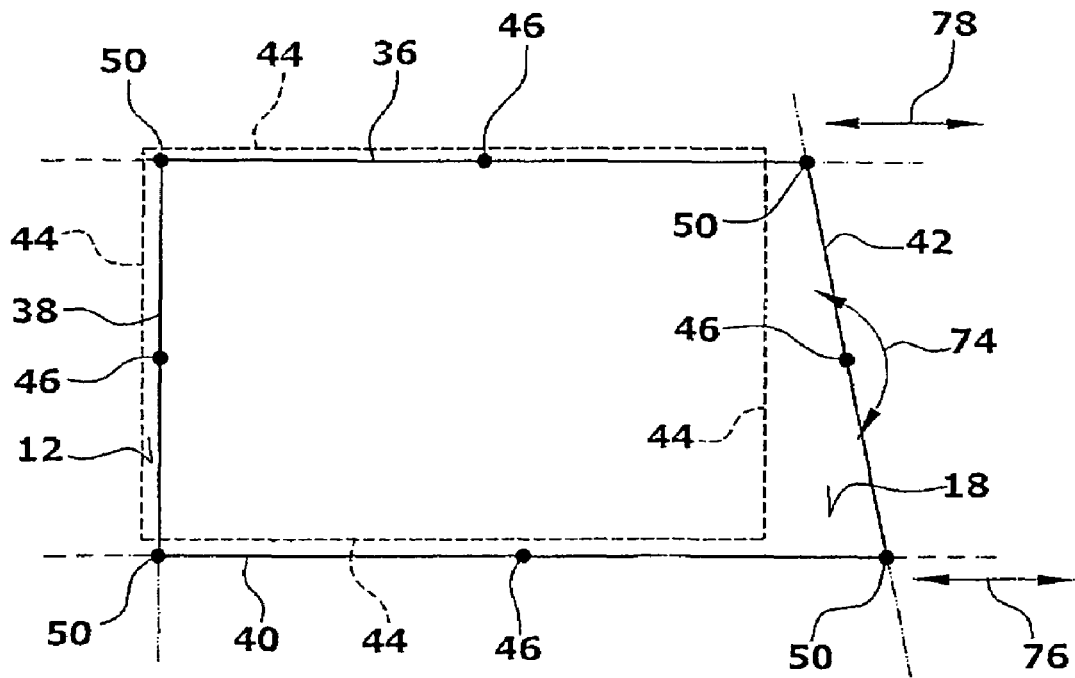
FIG. 6 is a schematic view of the image with perspective distortion shown in FIG. 3, with three processed image lines.
Figure 7:
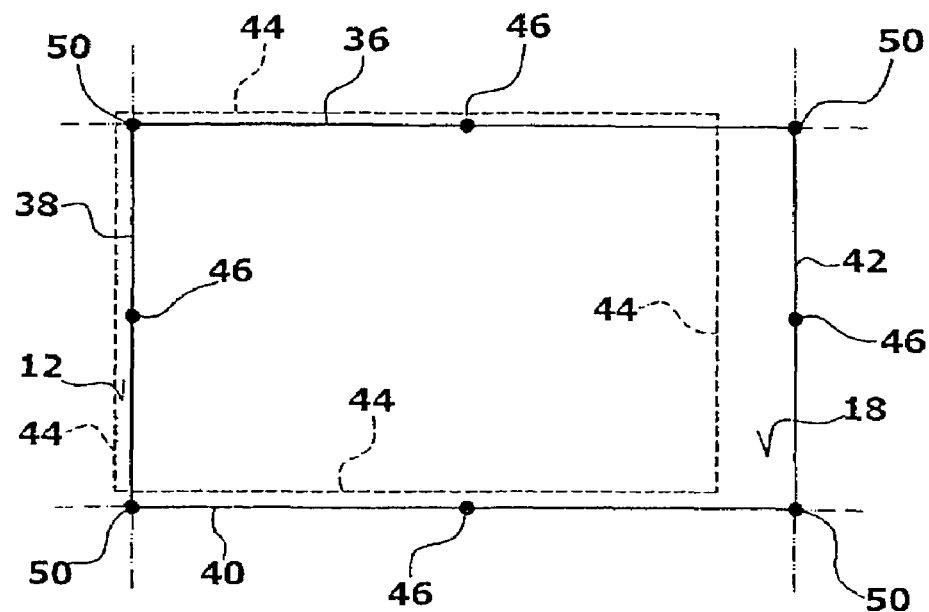
FIG. 7 is a schematic view of the image with perspective distortion shown in FIG. 3, with four processed image lines.
Figure 8:
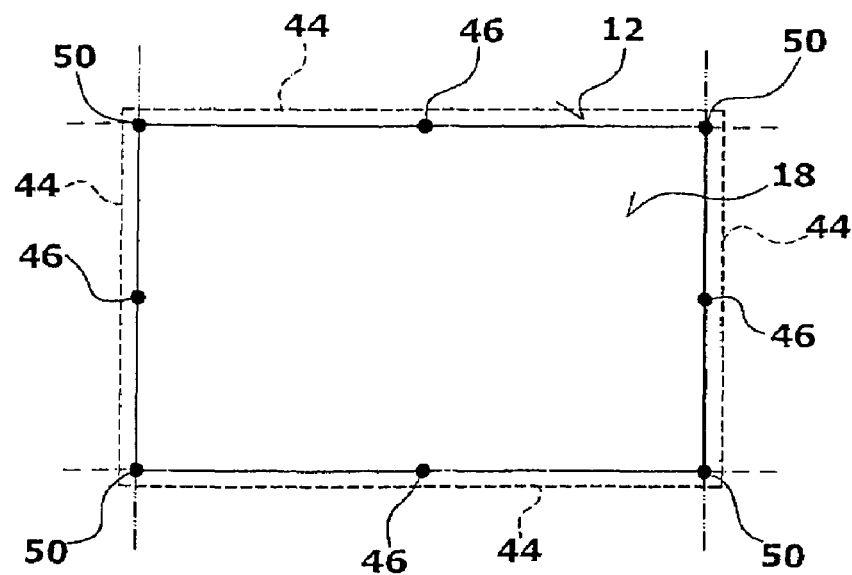
FIG. 8 is a schematic view of the processed image from FIG. 7 which has been oriented with the aid of projection lines of the projection surface.

Finally, after the lower image edge 40 has been oriented, the right image edge 42 is rotated about the point of rotation 46 in the direction of arrow 74, causing the lower image edge 40 and the upper image edge 36 to be stretched and compressed, respectively, in the directions of arrows 76 and 78, respectively (FIG. 6). After the rotation of all of the four image edges 36,38,40,42, there is obtained a rectangular projected image 18 in which, as the case may be, the aspect ratio of the horizontal image edges 36,40 relative to the vertical image edges 38,42 will still have to be adjusted (FIG. 7). For this purpose, the image edges 36,38,40,42 are displaced until they all of them have been arranged at equal distances to the projection lines 44 (FIG. 8). To achieve this effect, it may happen that already the displacing of merely one image edge 36,38,40,42 is sufficient because also the projected image 18 in its totality can be shifted or be enlarged or reduced in proportion.

Figure 9:
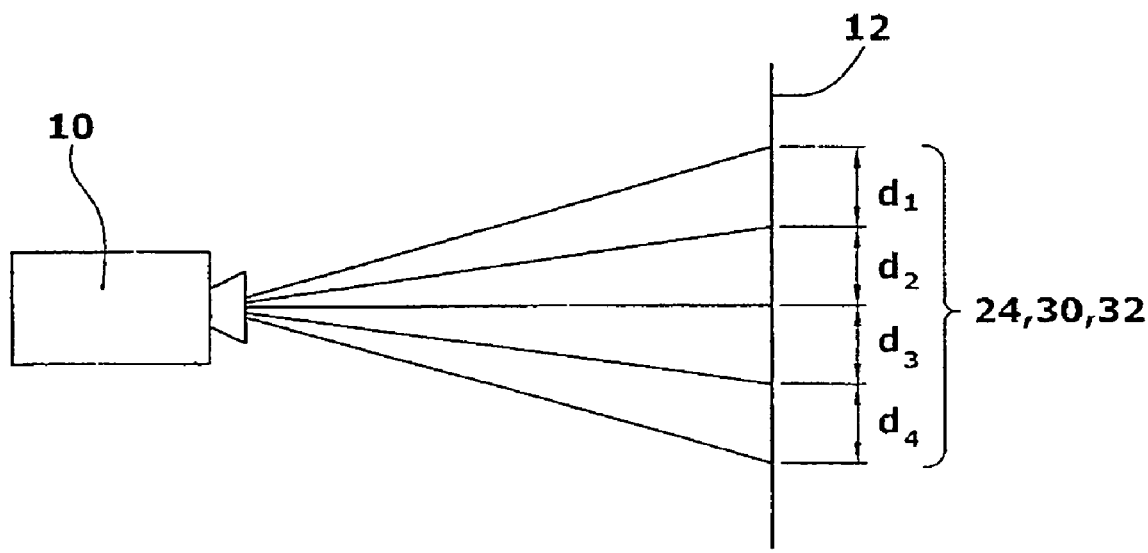
FIG. 9 is a schematic lateral view of partial sections of image lines while these are frontally projected onto a projection surface.
Figure 10:
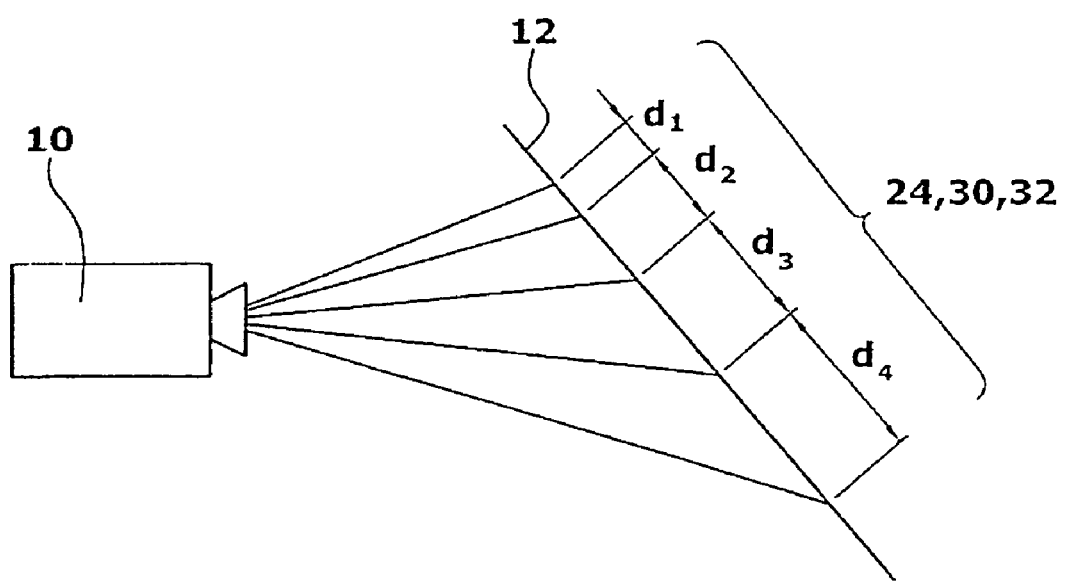
FIG. 10 is a schematic lateral view of the projected partial sections of the image lines while these are projected onto an obliquely oriented projection surface.
Figure 11:
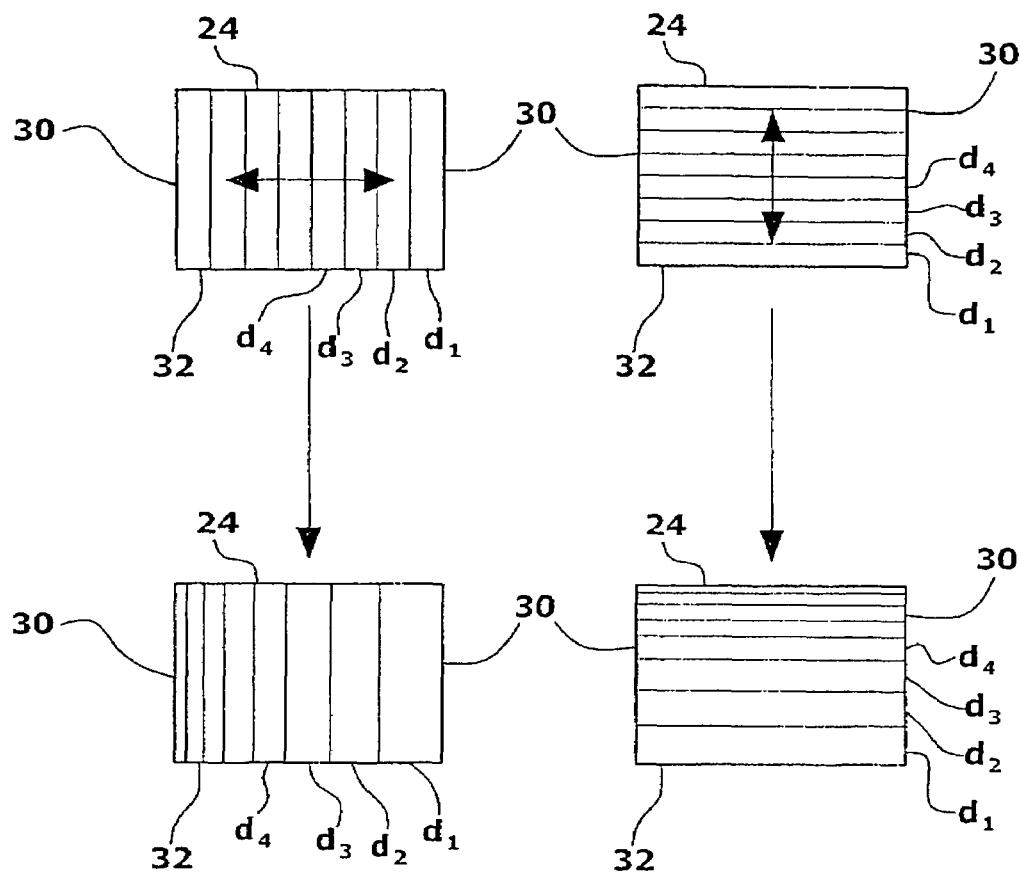
FIG. 11 is a schematic view of partial sections with uniform length distribution.

The image lines 24,30,32 comprise a plurality of partial sections d1, d2, d3, d4 which are all of the same length when the electronic image is projected frontally onto projection surface 12 by the projection means 10 (FIG. 9). When the projection surface 12 is arranged obliquely to projection means 10, the partial sections d1, d2, d3, d4 are differently stretched or compressed because of the perspective distortion (FIG. 10). This different stretching or compressing within the image content can be compensated for by effecting a corresponding stretching or compressing of the partial sections d1, d2, d3, d4 already in the electronic image, so that the perspective distortion will be balanced (FIG. 11). For this purpose, particularly, the overall length of the image lines 24,30,32 will be maintained. Further, the length ratios of two adjacent partial sections d1, d2, d3, d4 are set to be identical, resulting in d1/d2=d2/d3=d3/d4 etc.

Figure 12:
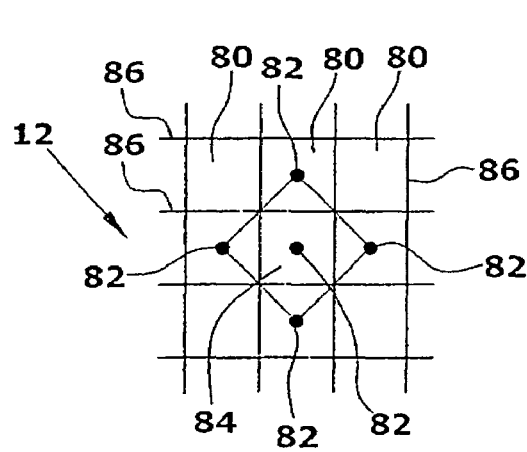
FIG. 12 is a schematic view of a plurality of image elements projected onto partial surfaces.

Further, it is possible to subdivide the projection surface 12 into a plurality of partial surfaces 80 whose shape is determined by partial projection lines 80 (FIG. 12). The partial surfaces 80 respectively comprise a center 82. The distance from the center 82 to the projection means 10 can be measured e.g. by a laser distometer, with the laser beam scanning the centers 82 of the partial surfaces 80 in a column-wise or line-wise order. In correspondence to the partial surfaces 80, the electronic image is divided into a plurality of partial images so that, corresponding to the distance of a partial surface assigned to a specific partial image, each partial image can be subjected to its own keystone correction.

It is also possible to measure the inward or outward bulge of a specific partial surface 84, e.g. by measuring the distances from four adjacent partial surfaces 80 which define a plane. On the basis of this plane, one can obtain an arithmetic distance for the specific partial surface 84. The extent by which this arithmetically calculated distance deviates from the measured distance is a measure of the inward or outward bulge of the specific partial surface 84. Preferably, to account for the inward or outward bulge of the projection surface 12, the image lines 24,30,32 are bent by use of the processing device.

Figure 13:
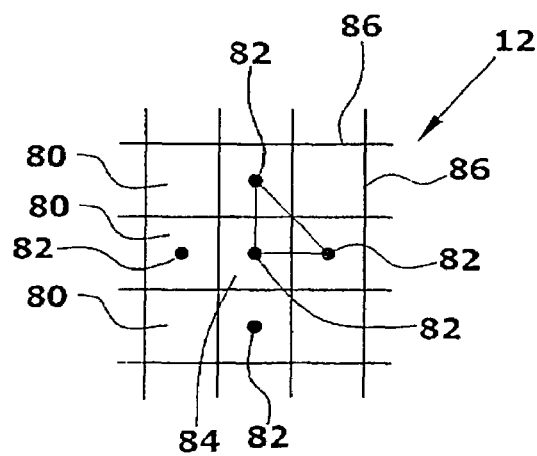
FIG. 13 is a further schematic view of a plurality of image elements projected onto partial surfaces.

Further still, it is possible to determine the orientation of a specific partial surface 84 by detecting the distance of the centers 82 of the specific partial surface 84 in space, and of two adjacent partial surfaces 80 (FIG. 13). In order to compensate for inaccuracies, it is also possible to compute a plurality of—possibly overlapping—planes on the basis of the measured centers 82 so as to be able, if required, to detect a possibly extremely irregular projection surface 12.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. An image processing method for processing an electronic image to be projected onto a projection surface, comprising the following steps:
   providing the electronic image, the electronic image comprising a plurality of image lines defining the shape of the electronic image, and an image content including a plurality of image elements:
   processing the image lines using a processing device for changing the electronic image, the image lines of the original electronic image comprise a plurality of partial sections of equal lengths;
   newly computing the image content taking account of all of the image lines, during the processing of the image lines are respectively differently at least one of stretched and compressed, when at least one of stretching and compressing the partial sections, an overall length of each image line is maintained; and
   representing the newly computed electronic image.

2. The image processing method according to claim 1, wherein a length ratio of two adjacent partial sections is set to be equal for all partial sections of each image line.

3. The image processing method according to claim 1, wherein, during the processing of the image lines, the processing device each time at least one of rotates and shifts exactly one image line to change at least one of an orientation and position of the image line, the orientation of the other image lines being maintained during the at least one of rotating and shifting of said one image line.

4. The image processing method according to claim 1, wherein the image lines respectively comprise two corner points and, during the processing of the image lines, one of the image lines is rotated about a point of rotation arranged between the two corner points at identical distances to both corner points.

5. The image processing method according to claim 1, wherein the points of rotation are in a center of the image lines.

6. The image processing method according to claim 1, wherein, as an original electronic image, use is made of a rectangular image with four outer image edges and, as image lines, use is made of the four image edges.

7. The image processing method according to claim 6, wherein the image lines are rotated and shifted until the image projected onto the projection surface is rectangular.

8. The image processing method according to claim 1, wherein the newly computed image is projected by a projection means onto a projection surface arranged at an arbitrarily selected orientation in space.

9. The image processing method according to claim 8, wherein the projection surface comprises projection lines defining the shape of the projection surface and wherein the image lines are at least one of rotated and shifted until the image lines have been aligned relative to the projection lines.

10. The image processing method according to claim 8 wherein the projection lines are automatically detected by a detecting means through at least one of distance measurements and contrast measurements and brightness measurement.

11. The image processing method according to claim 8 wherein the projection surface is divided into a plurality of partial surfaces having their shapes defined by a plurality of partial projection lines, wherein the electronic image is divided into a plurality of partial images having their shapes defined by a plurality of partial image lines, and wherein each of the partial image lines is processed individually by the processing device.

12. The image processing method according to claim 8 wherein the image lines are oriented relative to the projection lines substantially at equal distances, the orientation process being performed automatically.

13. An electronic computing device programmed to perform the method according to claim 1.

14. An image processing method for processing an electronic image to be projected onto a projection surface, comprising the following steps:
providing the electronic image, the electronic image comprising a plurality of image lines defining the shape of the electronic image, and an image content including a plurality of image elements,
processing the image lines using a processing device for changing the electronic image,
newly computing the image content taking account of all of the image lines; and
representing the newly computed electronic image,
wherein
during the processing of the image lines, the processing device at least one of rotates and shifts exactly one image line at a time to change at least one of an orientation and position of the image line, the orientation of the other image lines being maintained constant during the at least one of rotating and shifting of said one image line.

15. An electronic computing device programmed to perform the method according to claim 14.

16. An image processing device, particularly for performing an image processing method comprising
a storage device which stores electronic images comprising a plurality of image lines defining the shape of the electronic image, and an image content including a plurality of image elements, the image lines of the original electronic image including a plurality of partial sections of equal lengths;
a processing device provided to at least one of: (1) effect a respectively different at least one of rotation and compression of the partial sections, and (2) process at least one of a position and orientation of respectively exactly one image line at a time;
a computing device which performs a renewed computation of the image content of the electronic images taking into account all of the image lines; and
a representing device which represents the newly computed electronic image.

17. The image processing device according to claim 16 further including: a projector which projects the newly computed image onto a projection surface.

18. The image processing device according to claim 17 further including: a detector which automatically detects projection lines defining at least one of a shape of the projection surface and at least one of a relative orientation and position of the projector relative to the projection surface.

* * * * *